United States Patent [19]
Audouin et al.

[11] Patent Number: 5,301,052
[45] Date of Patent: Apr. 5, 1994

[54] COMMUNICATION METHOD AND NETWORK USING OPTICAL FIBERS WITH FREQUENCY MULTIPLEXING

[75] Inventors: Olivier Audouin, Savigny Sur Orge; Jean-Michel Gabriagues, Le Val Saint-Germain; Michel Sotom, Villebon Sur Yvette, all of France

[73] Assignee: Alcatel N.V., Amsterdam, Netherlands

[21] Appl. No.: 825,154

[22] Filed: Jan. 24, 1992

[30] Foreign Application Priority Data

Jan. 24, 1991 [FR] France ................... 9100791

[51] Int. Cl.$^5$ ............ H04B 10/20; H04J 14/02
[52] U.S. Cl. .................... 359/124; 359/125; 359/120; 359/121; 370/69.1; 370/71; 370/121
[58] Field of Search .................. 370/69.1, 71–73, 370/121, 124; 359/124–125, 120–121

[56] References Cited

U.S. PATENT DOCUMENTS

| | | | |
|---|---|---|---|
| 4,020,289 | 4/1977 | Anderson | 370/69.1 |
| 4,145,575 | 3/1979 | Shida | 370/72 |
| 4,703,474 | 10/1987 | Foschini | 359/124 |
| 4,730,301 | 3/1988 | McMahon | 359/124 |
| 4,789,980 | 12/1988 | Darcie | 370/69.1 |
| 4,797,879 | 1/1989 | Habbab | 359/121 |
| 4,873,681 | 10/1989 | Arthurs | 359/124 |
| 5,058,102 | 10/1991 | Heidemann | 370/71 |

FOREIGN PATENT DOCUMENTS 0381102  8/1990  European Pat. Off. .

OTHER PUBLICATIONS

Habbab et al., "Protocols for very high-speed optical fiber local area networks using a passive star topology", J. Lightwave Technology, v. LT-5 n. 12, Dec. 87, pp 1782–1793.

K. Kikuchi, et al., "AM Sideband Injection...", Conference Record, locking of Lasers for FDM Coherent Optical Communications".

IEEE/IEICE Global Telecomm. Conf. 1978, Tokyo, vol. 1, pp. 699–703.

C. Casper, et al., "Automatic Switching...", Technical Digest, European Conf. on Optical Comm., Helsinki, Sep. 1987, vol. 1, pp. 317–320.

L. G. Kazovsky, et al., "Multichannel Coherent, Conf. Record, IEEE Lightwave Technology".

Inter'l. Conf. on Comm., Philadelphia, Jun. 1988, vol. 3, pp. 1210–1218.

Primary Examiner—Leslie Pascal
Attorney, Agent, or Firm—Robbins, Berliner & Carson

[57] ABSTRACT

The emission frequencies (F(1) ... F(2P)) used for simultaneous communications form a stack extending from a fixed based frequency (F(0)) to a top of stack frequency (F(2P-1), F(2-P)). At the beginning of each call, the emission frequency (F(2P-1)) used for the call is at the top of the stack. During the call, said emission frequency is maintained by being servo-controlled to a predetermined spectrum distance (DF) beyond a lower support frequency (F(2P-2)) providing such a frequency can be detected. When such a frequency cannot be detected, the emission frequency is shifted progressively towards the base frequency. The invention is particularly applicable to communications between the peripherals of computer systems.

10 Claims, 7 Drawing Sheets

COMMUNICATION METHOD AND NETWORK USING OPTICAL FIBERS WITH FREQUENCY MULTIPLEXING

The present invention relates in particular to establishing a communications network over optical fibers.

BACKGROUND OF THE INVENTION

A network of the invention may include certain items that are common, as to their functions mentioned below, with a first known network. These items include:

a plurality of terminals respectively associated with as many user peripherals between which messages are to be transmitted;

two optical fibers associated with each of said terminals to guide optical waves, said fibers comprising an emission fiber for guiding emission waves emitted at an emission frequency from the terminal and a reception fiber for guiding waves received by the terminal; and a star coupler for receiving the optical waves that reach it via said emission fibers and for transmitting each of said optical waves to all of the other terminals via said reception fibers.

The emission frequencies of the various terminals vary over time. However, to avoid cross-talk, they must remain different and separated from one another by spectrum distances of not less than a frequency increment. The frequency increment is selected to reserve a message channel of sufficient bandwidth for each call in the spectrum range of the network. Thus starting from a base frequency, these frequencies form a sequence referred to below as a "stack" and which extends up to a stack top. Said sequence corresponds to a sequence of message channels which include said frequencies and also to a sequence of terminals which use said frequencies. In each of said frequencies, an item may be adjacent to another item, i.e. it may precede it or it may follow it. The top of the stack is constituted by one of the emission frequencies, or when a call is made over a plurality of frequencies by a group of such adjacent frequencies, with said frequency(ies) being furthest from the base frequency.

The various terminals may be identical to one another. That is why to facilitate the description of the operation of such a network one of the terminals is sometimes considered more particularly, which terminal may be constituted by any of the terminals and is referred to as the "terminal under consideration".

The said first known network is described in a first prior document constituted by European patent document EP-A-0 381 102 (F°16761). That document explains how the emission frequency of the terminal under consideration is established while is it preparing to enter into communication. The frequency is established by means of a "support". Such a "support" consists in the terminal under consideration establishing its emission frequency relative to a support frequency in such a manner that the spectrum distance between said emission frequency and said support frequency is equal to said frequency increment. If possible, the support is bilateral, i.e. it is taken from two support frequencies constituted by two emission frequencies that are separated by twice the frequency increment. Both of these frequencies then become adjacent to the emission frequency of the terminal under consideration and respectively constitute lower and upper support frequencies which precede and follow said emission frequency. In the event of one of the support frequencies being absent, support is taken from the sole support frequency to be detected and which may equally well be the support frequency that is above or the support frequency that is below the terminal under consideration. The emission frequency of the terminal under consideration then remains unchanged, at least in theory, so long as said terminal is emitting, even when both adjacent terminals have ceased to emit. As a result, at any instant, only some of the message channels of the network are occupied by transmitting a message, with some other channels being unoccupied at the same instant, except when all channels are busy. The spectrum range of the network must have room for these unoccupied channels. The range may be large if the number of terminals is large and if the message spectrum width is large.

That prior document mentions that when both adjacent terminals cease to emit, the frequency of the terminal under consideration may drift until it comes to be supported by the frequency of another terminal which is then emitting, or on a fixed base frequency. Slow and controlled drift of the emission frequencies could then systematically push a stack formed by said frequencies towards a predetermined end of the frequency range of the network.

However no means have been proposed that are useful for achieving such drift.

In said first known network, the emission frequency of the terminal under consideration is established after the frequency range of the network has been scanned. Before beginning a call the terminal itself performs said scanning. This enables it to identify possible emission frequencies that are unoccupied and are therefore available for emitting the message to be transmitted. An emission frequency identified in this way is selected and is initially used for sending calling signalling which includes at least the address of the called terminal. The time taken for scanning increases the access time of terminals to the network, i.e. the time which elapses on average between the instant at which a terminal receives an instruction from the associated user peripheral to transmit a message and the instant at which said transmission begins.

A second known network is described in a second prior document constituted by an article "Protocols for very high-speed optical fiber local area networks using a passive star topology" (Isam M. I. Habbab, Mohsen Kavehrad, and Carl-Erik E. Sundberg, Journal of Lightwave Technology, Vol. LT-5, No. 12, December 1987, pp. 1782–1793).

The spectrum range of said second known network includes a plurality of message channels together with a signalling channel and it appears that the positions of the channels are predetermined. The signalling channel is reserved for transmitting signalling, in particular for enabling a calling terminal to indicate the message channel that is to be used for a call to the called terminal.

The present invention has the following objects in particular:

facilitating implementation and operation of an optical fiber communications network with frequency multiplexing;

limiting the size of the frequency range of such a network; and limiting the access time of a terminal to the network.

SUMMARY OF THE INVENTION

For these purposes, it provides, in particular, a communications method over optical fibers with frequency multiplexing, in which method emission frequencies (F(1) ... F(2P)) used as carrier frequencies for simultaneous calls form a stack in which they follow one another from a base frequency (F(0)) up to a top of the stack (F(2P-1), F(2P)) being distant from one another by spectrum distances that are not less than a predetermined frequency increment (DF), wherein prior to each call, each emission frequency that is to be used for the call is brought to the top of the stack (FM1) and then, during the call, each emission frequency (F(2P-1)) is servo-controlled to a spectrum distance equal to said frequency increment (DF) beyond a lower support frequency (F(2P-2)) specific to said emission frequency, with this taking place so long as such a lower support frequency can be detected on which to perform said servo-control, said emission frequency being shifted progressively towards said base frequency (F(0)) whenever no such lower support frequency can be detected.

More precisely, in a method of the present invention, prior to each call, the emission frequency(ies) of the terminals that are to take part in the call is/are placed on the top of the stack, which terminals include, for example, the terminal under consideration. Throughout the time the terminal under consideration is in communication, it detects the presence or the absence of a support wave beneath the terminal. If such a wave exists it is an optical wave present on the reception fiber of the terminal and the frequency of said wave constitutes a lower support frequency for the terminal which maintains its emission frequency at a spectrum distance therefrom constituting a support distance. To constitute such a distance, a spectrum distance must lie in a predetermined support range which includes at least said frequency increment. This range may also include spectrum distances that may move away from said increment but that must remain such that the position servo-control means of the terminal under consideration can change the emission frequency to bring said support distance closer to said frequency increment. The support wave beneath the terminal under consideration may be constituted, in particular, by the emission wave of the preceding terminal. When it detects the presence of a lower support wave, the terminal under consideration uses its position servo-control means to servo-control its support distance to the frequency increment. In the absence of such a support wave, it shifts its emission frequency progressively towards the base frequency.

BRIEF DESCRIPTION OF THE DRAWINGS

Embodiments of the invention are described by way of example with reference to the accompanying drawings, in which.

DETAILED DESCRIPTION

Figure 1:
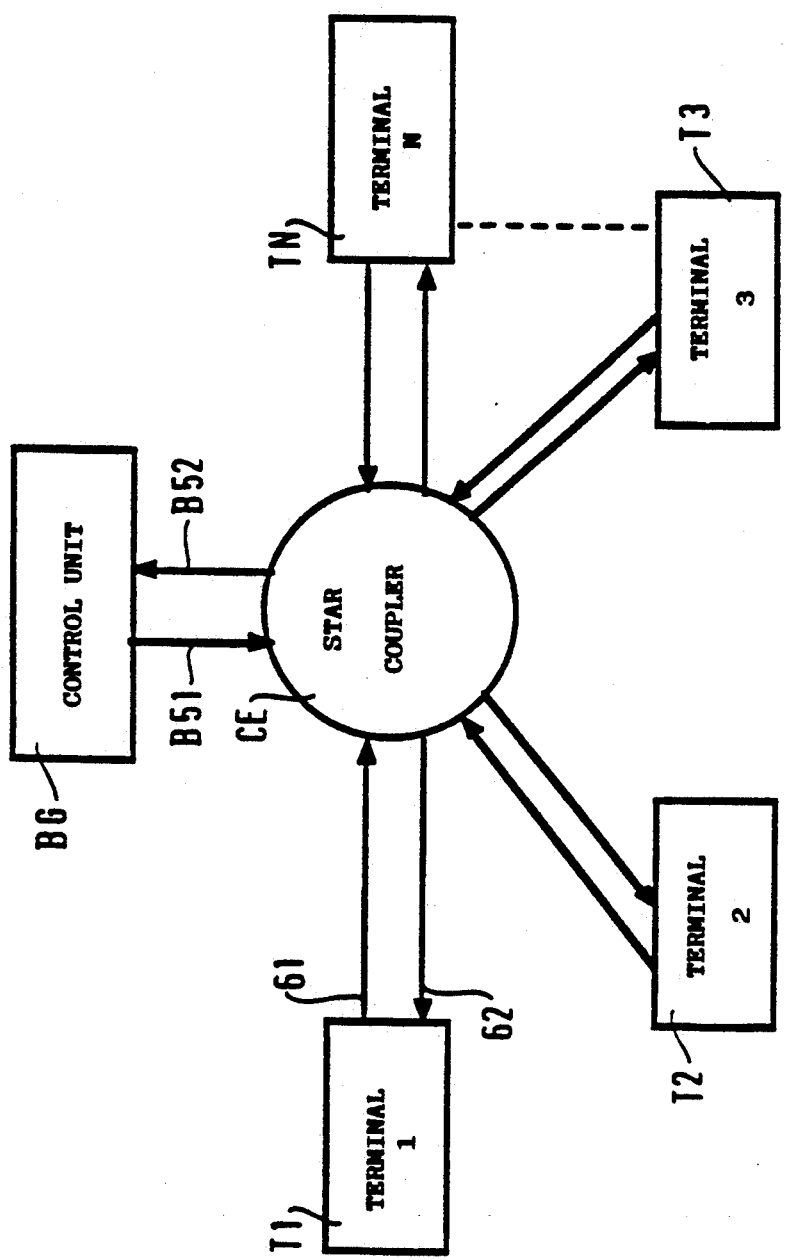
FIG. 1 is an overall view common, in particular, both to a first data network and to a second data network given as examples of implementations of the present invention.

With reference to FIG. 1, the present description begins by recalling the general structure common to networks of this kind. Such a network comprises the following items:

a plurality of terminals (T1, T2, T3, ..., TN) associated with respective user peripherals between which messages are to be transmitted;

two optical fibers associated with each of said terminals (T1) for guiding optical waves, said fibers comprising an emission fiber (61) for guiding emission waves emitted at an emission frequency of the terminal and a reception fiber (62) for guiding waves that are to be received by the terminal; and a star coupler (CE) for receiving the optical waves that reach it via said emission fibers, and for transmitting each of said optical waves to all of said terminals via said reception fibers.

Figure 3:
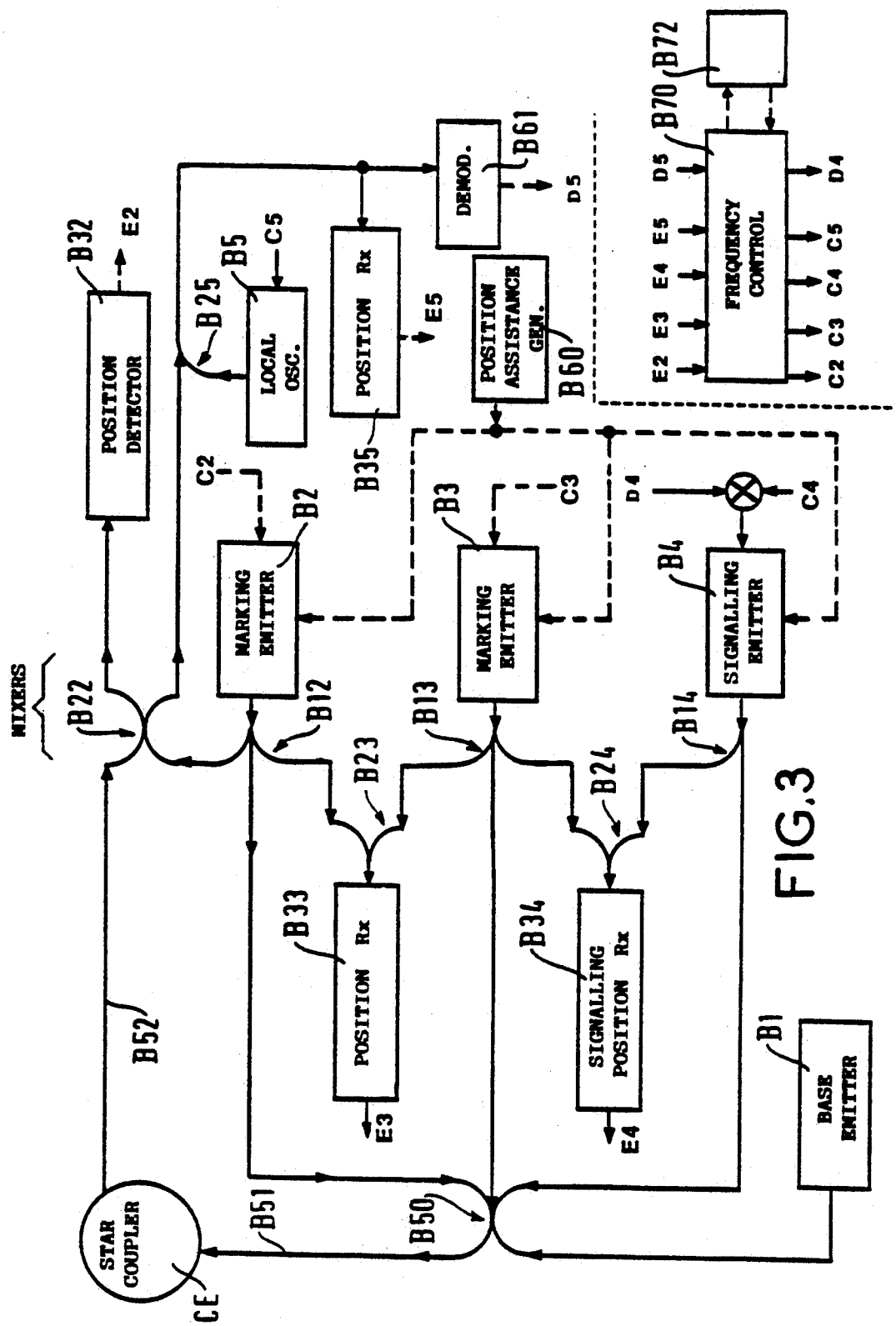
FIG. 3 is a block diagram of a control unit belonging to said network.

A control unit BG includes a base generator (B1) which is shown in FIG. 3 and which emits an optical base wave at a base frequency (FO) to constitute a frequency reference for controlling said emission frequencies.

In such a network, each of the terminals is sometimes free and sometimes busy. When it is busy, it may be precalling and/or precalled and then it may be calling or called.

A terminal is calling and emitting while it is transmitting a message to a called terminal in the form of information-carrying modulation on an optical carrier wave which constitutes an emission wave from said terminal and which is emitted for a call duration. It is assumed below that the frequency specific to said carrier wave constitutes simultaneously an emission frequency and spectrum position of said terminal, and a transmission frequency for said message. It can be varied on command over a spectrum range of the network. Its position within said range may be defined on the basis of the base frequency. Below, when it is said that said transmission frequency is, at a given instant, more or less close or more or less distant or that in the course in time it moves closer or it moves away, the description relates to the closeness or the distance of said transmission frequency relative to said base frequency. To simplify some of the explanation, the case where the base frequency is lower than the emission frequencies is sometimes considered more particularly, and words such as "higher" and "lower" applied to frequencies relate to such circumstances. The frequencies of the modulated emission wave lie in a message channel which is reserved within the frequency range of the network for transmitting a message, and which for said purpose has a message spectrum width. This wave is received by the called terminal and constitutes for said terminal a reception wave whose frequency constitutes a reception frequency. The terminal is then receiving. The calling and the called terminals are in pairs forming respective pairs of terminals in communication with each other.

Communication may be one-way. A single message is then transmitted. It is transmitted from the calling terminal to the called terminal. Communication may also be two-way. Under such circumstances, it may be performed in so-called "alternating" mode. The calling terminal and the called terminal then take up the same position in the spectrum and the same message channel is occupied by go messages and by return messages which follow one another in time. Two-way communication may also be performed in so-called "duplex" mode. Under such circumstances, the above-mentioned message then constitutes a go message occupying a go message channel. The called terminal is suitable for responding to said message by emitting a return message during the same call period. The return message is transmitted to the calling terminal on an optical carrier wave which occupies a return message channel and which constitutes an emission wave for the called terminal and a reception wave for the calling terminal. A call is then constituted by the go and receive message channels taken together.

A free terminal becomes a pre-calling terminal when, in response to an instruction from the user peripheral associated therewith, it prepares or emits a calling signal including the address of a precalled terminal for the purpose of then setting up a call during which said precalling terminal and said precalled terminal become a calling terminal and a called terminal respectively.

There follows a description in general terms of the various dispositions which have been found to be advantageous, in particular in the context of the present invention, for implementing networks of this kind. These dispositions are adopted in the two networks given by way of example and they will be better understood during the subsequent description of these networks in more concrete terms.

The terminals of the networks are similar to one another. That is why only one of them is considered when describing their internal structure. In a disposition that is common to the first previously-mentioned known network and to the two networks given as examples of the present invention, the terminal under consideration includes the following items:

an emitter (1) controllable at least in frequency to emit said emission wave and to apply information-carrying modulation to said wave;

emission positioning means for positioning the emission frequency of said emitter in a spectrum range of the network, by forming a stack of emission frequencies which are variable and which follow one another starting from a fixed base frequency and going to the top of the stack, and being separated from one another by spectrum distances that are not less than a predetermined frequency increment;

reception means for demodulating some of the waves received by the terminal under consideration; and a control circuit (40) for controlling the emitter, the emission positioning means, and the reception means.

The emission positioning means of the terminals are such that their emission frequencies form a sequence of frequencies at intervals with bottom limits in which each next frequency is separated from a preceding frequency by an inter-terminal distance that cannot drop significantly below a predetermined frequency increment (DF) that is greater than said message spectrum width. That is why the positioning means of the terminal in question include emission support means themselves including the following items:

an emission positioning mixer (31) for mixing the waves received by the terminal in question with a local emission positioning wave having a local emission positioning frequency (F(2P-1)A) in the optical range and which is applied to a local input (31A) of the mixer by the emitter (1) of the terminal to represent its emission frequency (F(2P-1));

an emission positioning detector (10) fed by said emission positioning mixer to form electrical beat signals each resulting from the mixing of said local emission positioning wave with one of said received waves which corresponds to said signal, at least one of said signals constituting an emission positioning beat signal (F(2P-2)BE) if that one of said received waves which corresponds thereto constitutes an external emission positioning wave (F(2P-1)B) defining a support frequency (F(2P-2)) of the terminal under consideration, the frequency of said signal constituting an emission positioning beat frequency (F(2P-1)A-F(F(2P-2)B) which defines a support distance (F(2P-1)-F(F(2P-2)) between said emission frequency (F(2P-1)) and said support frequency (F(2P-2)), one of said received waves constituting said external positioning wave only if said support distance is situated in a predetermined support interval including said frequency increment (DF);

an emission position discriminator (11) for receiving said emission position beat signal and for responding thereto by providing an emission position signal representative of an emission position difference equal to the difference between said emission positioning beat frequency (F(2P-1)A-F(F(2P-2)B) and a reference emission positioning frequency (DF-2FS) such that eliminating said difference means that the difference between said emission frequency (F(2P-1)) and said support frequency (F(2P-2)) of the terminal under consideration is equal to said frequency increment (DF); and emission position control means (40) which control said emission frequency of said terminal in response to said emission position difference signal to make said emission positioning beat signal equal to said emission positioning reference frequency.

If the terminal under consideration is at spectrum distances more or less equal to the increment DF both as a preceding terminal and as a following terminal, then the detector 10 delivers two emission positioning beat signals.

That is why, in an advantageous disposition, the emission position discriminator (11) includes an emission positioning filter for selecting and superposing two of said emission positioning beat signals, said filter being set to a frequency equal to said emission positioning reference frequency and having a narrow passband centered on said frequency, said emission position signal being representative of the power of the output signal from said filter, and said emission position control means (40) controlling said emission frequency (F(2P-1)) of said terminal to deliver said maximum amplitude.

The reception means may be of the heterodyne type and may include the following items:

a local oscillator (2) for providing a local reception wave which is optical and whose frequency is controllable, constituting a local reception frequency (L(2P-1)) of the terminal under consideration;

a heterodyning mixer (32) receiving firstly said waves received by the terminal under consideration, such a wave constituting one of said reception waves and having one of said reception frequencies (F(2P)) for the terminal under consideration when the message carried by said wave is to be transmitted to said terminal, said mixer receiving secondly said local reception wave and mixing said wave with said received waves;

a heterodyning detector (20) fed by said heterodyning mixer to provide electrical beat signals, one of which is a reception beat signal (K(2P)H) having a reception beat frequency which is the difference between said reception frequency and said local reception frequency and which is close to a predetermined intermediate frequency (FI);

a demodulation filter (22) for receiving said reception beat signal, for demodulating it, and for providing a demodulated signal representative of said information to be transmitted to the terminal under consideration and carried by said reception wave;

a frequency discriminator constituting a reception position discriminator (21) for receiving said reception beat signal and for responding thereto by providing a reception position error signal representative of the difference between said reception beat frequency and said intermediate frequency (FI); and reception position control means (40) which controls said local reception frequency in response to said reception position error signal to make said reception beat frequency equal to said intermediate frequency.

The control circuit of the terminal under consideration is connected to the user peripheral associated with said terminal to receive therefrom a message to be transmitted. It includes modulation means which control the emitter of said terminal accordingly to provide said information-conveying modulation of the emission wave when the terminal under consideration is emitting. It includes said emission position control means. It receives said demodulated signal and includes address-recognition means for recognizing the address of the terminal under consideration. It switches the terminal to receive mode when said address has been recognized and it subsequently transmits the received message to the associated user peripheral. It receives said reception beat signal and it includes said means for controlling reception position.

In addition, the terminal under consideration is suitable for emitting and receiving signalling in the form of modulation which affects optical carrier waves that are guided by said emission and reception fibers of said terminal and which are transmitted via said star coupler. Such signalling includes a calling signal which is emitted by the terminal when it is precalling and which includes the address of the precalled terminal.

In an advantageous "stack compression" disposition, the control circuit of the terminal under consideration is permanently ready, i.e. at all instants throughout the duration of a call, to vary the emission frequency of the terminal.

Such variation is performed if a support frequency lower than the terminal (as defined below) moves towards the base frequency. Under such circumstances, the emission frequency of the terminal under consideration accompanies the displacement of said support frequency. Such a variation is also performed if such a lower support frequency that was previously in use disappears. Under such circumstances, the emission frequency moves progressively towards the base frequency until a new lower support frequency can be defined. The new lower support frequency may be the emission frequency of a preceding terminal if such a terminal exists, or it may be the base frequency itself.

The emission positioning means of the terminal under consideration enable it to perform these functions by means of the above-mentioned items except that the emission position control means include stack compression means for this purpose which may be incorporated in the control circuit of the terminal and which are as follows:

initial emission positioning means which are put into action when the terminal under consideration becomes free or at least before the beginning of a new call, these means bring the current emission frequency of the terminal under consideration to the top of the stack of the emission frequencies of the various terminals; for example they may move said frequency progressively away from the previously used emission frequency until they detect that said emission frequency has indeed reached the top of the stack;

lower support detection means for detecting the possible presence amongst the waves received by the terminal under consideration of an external lower emission positioning wave constituted by one of said external emission positioning waves defining a lower support frequency for the terminal; such a frequency is called a "support" frequency for the terminal providing said support frequency is closer to the base frequency than is the emission frequency of the terminal; said means provide a loss-of-lower-support signal when such an external lower emission positioning wave no longer exists;

means for servo-controlling the emission position during a call which are kept in action during the call so long as there exists one such lower support frequency for the terminal under consideration; said means are called "emission support means" and they control the emission frequency of said terminal in the manner indicated above to eliminate said difference in emission position; and emission shift means which are put into action during a call when one of said loss-of-lower-support signals is provided for the terminal under consideration; these means move the emission frequency of the terminal progressively towards the base frequency until said loss-of-lower-support signal is no longer provided.

This moving together of frequencies is performed at a shift speed which is preferably chosen to be large. However this speed must be small enough to enable the emission position servo-control means of a following terminal to follow the variation in said frequency. This is necessary because said frequency constitutes the lower support frequency for the following terminal.

A stack of emission frequencies is thus achieved for the various terminals building up from the base frequency. These frequencies follow one another at intervals, many of which are normal intervals equal to said frequency increment. A larger frequency interval appears when a terminal stops transmitting a message.

Under such circumstances, the following terminal can no longer define a lower support frequency. It therefore progressively and regularly shifts its emission frequency towards the base frequency during a shift period which constitutes a fraction of said call period and which comes to an end either when a new lower support frequency can be defined or else when the call is over. If the frequency shift speed is chosen to be large enough, the shift period is small enough for large frequency gaps increasing the total width of the spectrum range required by the network to be kept to a small amount only.

In another advantageous disposition, said lower support detection means for the terminal under consideration comprise the following items:

non-selective support detection means for supplying a loss-of-support signal when one of said external emission positioning waves for the terminal no longer exists; for this purpose, these means may monitor said emission position signal which is representative of the power of the emission positioning beat signal; a predetermined drop such as a rapid drop of about 50% in said power indicates either that an external lower emission positioning wave has disappeared or else that an external upper emission positioning wave has disappeared; under such circumstances, said means trigger the appearance of the loss of support signal; and support discrimination means which are put into operation at least when said loss-of-support signal is provided and which then provide said loss-of-lower-support signal if the external emission positioning wave that has disappeared is a lower one of said external emission positioning waves.

The two networks given by way of example differ from each other as to the structure of said support discrimination means. The first network operates in duplex mode. As a result, while the terminal under consideration is engaged in a call, it uses two adjacent emission frequencies and the terminal in question is emitting either on the lower frequency or on the upper frequency of the call. It therefore constitutes either the lower terminal or the upper terminal of the pair of terminals that are communicating with each other, it being understood that the lower terminal is the terminal that comes before the other terminal in said pair in the sequence of the terminals that corresponds to the stack of emission frequencies. In the first network given by way of example, the lower terminal is the calling terminal, but it will be understood that it could equally well be the called terminal.

In an advantageous disposition, the support discrimination means of the terminal under consideration in a network operating in duplex mode records a relative position bit at the beginning of each call and retains it until the end of the call, said bit representing the fact that the terminal under consideration is calling or called and is consequently the lower terminal or the upper terminal in the pair of terminals concerned by a given call. These means provide a low indication if the terminal is the lower terminal of the pair. The said loss-of-lower-support signal is provided when said loss-of-support signal and said low indication are provided simultaneously. As a result, the pair of terminals under consideration, i.e. the pair including the terminal under consideration during a call under consideration, will offset its two emission frequencies towards the base frequency if the preceding call disappears, while, in contrast, the two emission frequencies of the pair under consideration will remain unchanged if it is the following call that disappears.

It should be understood that in practice the various means included in the control circuit are advantageously implemented in the form of program elements incorporated in said circuit.

In another advantageous disposition, the network includes a marking generator for prior marking at a marking instant one or more spectrum positions which are marked for use during the next call. These marked positions are spectrum positions which are not occupied by any of the terminals in the network at the marking instant and which are to be seized by one or more of the terminals to implement the next call, i.e. the first call to begin on the network after said instant.

Such prior marking has the advantage of reducing the access time of the network.

The structure of the marking generator may be analogous to that of the terminal under consideration except that no information-carrying modulation is required on the optical waves that it emits since the only function of these waves is to define frequencies.

It includes the following items:

an emission fiber (B51) and a reception fiber (B52) for connecting it to said star coupler (CE) like the terminal under consideration;

at least one marking emitter (B2) that is controllable in frequency to emit an optical marking wave (FM1) on said emission fiber; and marking positioning means (B22, B32, B70) controlling the marking emitter to give the marking wave a marking frequency (FM1) having a predetermined relationship with a spectrum position that is to be seized to establish the next call by means of a terminal participating in said call, which position is thus marked by said marking wave.

The predetermined relationship is such that the marking wave facilitates and/or accelerates displacement of the emission frequency which the terminal participating in the call must perform to reach the marked spectrum position.

By way of examples of such predetermined relationships, the marking frequency may coincide with the marked position or it may be situated at a predetermined spectrum distance from said marked position, which distance is related to said frequency increment.

Naturally, when the network includes the above-mentioned stack compression means, the position(s) marked by the marking generator(s) is/are situated at the top of the stack, as described below.

In another advantageous disposition, the network includes a signalling reference generator which itself includes:

a signalling emitter (B4) which is controllable in frequency to emit an optical wave that constitutes a signalling reference wave at a signalling frequency (FZ);

signalling positioning means including signalling position servo-control means and signalling position shift means for positioning said signalling frequency in the spectrum range of the network;

an emission fiber (B51) for guiding said signalling reference wave to said star coupler (CE); and a reception fiber (B52) for guiding optical waves that have been transmitted to the coupler and which are received by said generator.

The signalling position servo-control means are analogous to the control means of the terminal under consideration and include the following items:

a signalling positioning mixer (B24) for receiving firstly said waves received by the signalling reference generator and secondly a local signalling positioning wave that is optical and that defines said signalling frequency;

a signalling positioning receiver (B34) fed by said signalling positioning mixer to form electrical beat signals one of which is a signalling positioning beat signal that results from mixing said local signalling positioning wave with an external signalling positioning wave constituted by one of said received waves defining a signalling support frequency which is the most distant frequency in the stack of said emission frequencies, the frequency of said signal constituting a signalling positioning beat frequency lying in a predetermined range and representative of a spectrum distance between said signalling frequency and said signalling support frequency;

a signalling position discriminator (not shown) for receiving said signalling positioning beat signal and for responding thereto by providing a signalling position signal representative of the difference between said signalling positioning beat frequency and a predetermined frequency; and signalling frequency control means (B70) which control said signalling frequency in response to said signalling position signal to servo-control the spectrum distance between said signalling frequency and said signalling support frequency to a predetermined spectrum distance supplement which constitutes a signalling supplement.

The signalling position shift means move the signalling frequency away when a new call is established, with this being done over a shift distance that is equal to a number of frequency increments equal to the number of emission frequencies that are used by the new call.

The emission positioning means of the terminal under consideration then include, in association with its said control circuit:

signalling search means for moving its emission frequency progressively away from the base frequency when the terminal becomes free, and for recognizing when said emission frequency coincides with said signalling frequency; and standby servo-control means controlled by said signalling search means to servo-control said emission frequency to said signalling frequency from the moment when coincidence between said two frequencies is recognized.

This disposition has the advantage that the access time to the network is reduced by the fact that when the terminal under consideration is free, its spectrum position is at least close to the position that it will occupy during its next call.

The control circuit (40) of the terminal under consideration further includes call signalling means for modulating said emission wave having said signalling frequency with call signalling and for emitting said signalling when a message is to be transmitted by said terminal, the frequencies of the emission wave as modulated in this way occupying a signalling channel (KZ) having a signalling spectrum bandwidth.

The terminal under consideration under includes reception standby initial positioning means (B70) for bringing said local frequency of said terminal to a spectrum position whose distance from said signalling frequency is equal to said intermediate frequency when said terminal is free so as to enable said reception means subsequently to receive messages in the signalling channel (KZ).

The said emission positioning means of the terminal under consideration include emission search means which are put into operation when the terminal is to switch to emission and which move its emission frequency towards said base frequency from said signalling frequency down to a pre-emission position in which one of said lower support frequencies appears for said terminal, and reception search means which are put into operation by said control circuit when said terminal is to switch to reception and which bring said local reception frequency of said terminal to a pre-reception position whose distance from the pre-emission position of one of said terminals is equal to said intermediate frequency.

The pre-emission position used for establishing said prereception position of the terminal under consideration is the pre-emission position of the same terminal if the call is being established in alternating mode. If the call is being established in duplex mode, the pre-emission position used is the pre-emission position of the terminal which is paired with the terminal under consideration.

In another advantageous disposition, the signalling reference generator is included in the control unit BG. The control unit also includes reception means similar to said reception means in the terminal under consideration and a control circuit which is analogous to said control circuit of the terminal under consideration except that firstly it does not provide communication with an associated user peripheral and secondly it is required to receive, to process, and to emit signalling over the signalling channel for the purpose of controlling the network.

In another advantageous disposition, the signalling reference generator constitutes one of said marking generators and for this purpose it further includes:

at least one first marking emitter (B2) of controllable frequency for emitting a first marking wave on said emission fiber of said generator; and first marking positioning means for giving said wave a first marking frequency (FM1).

Said first marking positioning means are analogous to the emission positioning means and include the following items:

a first marking positioning mixer (B22) for receiving firstly said waves received by the signalling reference generator and secondly a local first marking positioning wave that is optical and that defines the first marking frequency;

a first marking positioning detector (B32) fed by the first marking positioning mixer to form beat signals that are electrical, one of which is a first marking positioning beat signal resulting from mixing said local first marking positioning wave with one of said received waves that defines said signalling support frequency (F2P), the frequency of said signal constituting a first marking positioning beat frequency lying in a predetermined interval and representative of an interval between said first marking frequency and said signalling support frequency; and a first marking positioning discriminator (not shown) for receiving said first marking positioning beat signal and for responding thereto by providing a first marking position signal representative of the difference between said first marking position beat frequency and a predetermined frequency.

The control circuit (B70) of the signalling reference generator generates the first marking frequency in response to the first marking position error signal to servo-control the spectrum distance between said first marking frequency and the signalling support frequency (F2P) to said frequency increment (DF).

When the terminal under consideration is to switch to reception while in communication with another terminal which is positioned on said first marking frequency, the first marking wave enables the terminal under consideration to servo-control its local reception frequency relative to said first marking frequency without needing to wait for an emission from said other terminal for this purpose. If the marking frequency is unique, said signalling supplement is advantageously equal to twice said frequency increment.

When operating in duplex mode where two adjacent message channels are used for each call and where the terminal under consideration is the upper terminal, i.e. is to occupy the upper channel, i.e. the channel whose carrier frequency is further from the base frequency, said first marking frequency also constitutes said lower support frequency for said terminal.

Under such circumstances, a second marking frequency (FM2) follows the first at a distance equal to said frequency increment. A corresponding second marking wave is emitted by a second marking emitter (B3) provided with spectrum positioning means analogous to the above means. It enables the signalling frequency and the local reception frequency of the upper terminal to be positioned.

The signalling supplement is then advantageously equal to three times said frequency increment.

In another advantageous disposition the means for servo-controlling the emission position of the terminal under consideration further include spectrum positioning assistance means themselves including:

a positioning assistance generator (53) for providing a positioning assistance signal at a predetermined positioning assistance frequency (FS); and positioning assistance modulation means (1) for modulating at least a fraction of the emission wave from the terminal under consideration by said positioning assistance signal so as to generate two positioning assistance side waves at two positioning assistance side frequencies whose spectrum distances from the emission frequency (F(2P-1)) of said terminal are equal to said positioning assistance frequency (FS). A first side wave has a first positioning assistance side frequency (F(2P-1)A) closer to said lower support frequency (F(2P-2)) of said terminal than its emission frequency. It constitutes said local emission positioning wave transmitted to said emission positioning mixer of the terminal under consideration.

The second positioning assistance side wave formed in this way constitutes said external emission positioning wave for the terminal following the terminal under consideration.

The positioning assistance frequency (FS) preferably lies between one-fourth and one-half of said frequency increment (DF).

These positioning assistance means present the advantage that the emission positioning beat frequency may be much less than the support distance. It may be situated, for example, in the microwave range whereas the support distance is substantially equal to the frequency increment which is situated in the optical frequency range. The emission positioning beat signal can thus be processed by means of well-known electronic components of acceptable price. Given the presence of these positioning assistance means, it will be understood that when it is specified above that a wave, a signal, or a first frequency defines a second frequency or a spectrum distance such as a support distance, that means that the second frequency or distance defined in that way is equal to the defining frequency plus or minus a predetermined value, said defining frequency being the frequency of said wave or said signal or being said first frequency, said predetermined value being equal to one or two times the positioning assistance frequency.

In the two networks given by way of example, the frequency (F(2P-1)A-(F(2P-2)B) which defines the support distance (F(EP-A)-F(EP-2)) is equal to said distance minus twice the positioning assistance frequency (FS). Given the fact that said support distance is substantially equal to the frequency increment (DF), the frequency which defines the support distance is substantially equal to DF-2FS.

Another advantageous disposition concerns the use that may be made of a signalling channel that includes the signalling frequency and all of the frequencies occupied by the various signalling transmitted over the network to set up and control calls, and more generally to control the network.

Such signalling includes the following in particular:

calling signalling emitted by a precalling terminal and containing the address of the precalled terminal;

call acknowledge signalling emitted by the precalled terminal in response to the calling signalling to inform the precalling terminal that the precalled terminal is ready to set up a call; and signalling to allocate a call entitlement, which signalling is used when two terminals seek to establish two different calls simultaneously on the same channel, with the signalling then defining which call has priority.

The advantage of this disposition appears when many calls but not all calls need to transmit messages in limited time, with the messages each including a large quantity of data, which messages may be called "heavyweight". During "heavyweight" calls, the high data rate requires message channels of large bandwidth, whereas during other more "lightweight" calls require less bandwidth. In this disposition, the signalling channel is shared between the various network terminals not only for transmitting said signalling but also for transmitting "lightweight" messages, i.e. messages each including a relatively small amount of data.

More precisely, the terminal under consideration includes:

means for classifying messages to indicate whether a message to be transmitted is a heavyweight message that needs to be transmitted at a relatively high data rate over a relatively long call duration or whether the message is a lightweight message that can be transmitted at a relatively low data rate and/or during a relatively short call duration;

heavyweight message transmission means for transmitting said heavyweight messages in said message channels; and lightweight message transmission means for transmitting said lightweight messages in said signalling channel which then constitutes a channel that is shared between said terminals.

The message classification means are incorporated in the control circuit 40.

The heavyweight message transmission means of the terminal under consideration are the means as described above and they come into action only when the terminal is busy. Its lightweight message transmission means are the same means except that they are put into action by its control circuit while the terminal is in a situation described above as being that of a free terminal. They are put into action when the user peripheral associated with the terminal seeks to emit a message and the message is classified as being lightweight.

This disposition makes it possible, without excessively increasing the bandwidth of the signalling channel, to considerably reduce the number of message channels when the number of heavyweight messages to be transmitted per unit time is significantly smaller than the total number of messages. The spectrum available to the network is thus used more efficiently.

In another advantageous disposition, the bandwidth of the shared channel is substantially equal to said message bandwidth.

The electronic components used by the shared channel can then be substantially the same as those used by the message channels.

In another advantageous disposition, the shared channel is time multiplexed between said terminals or at least between those of said terminals that are not busy transmitting a heavyweight message, with each of the terminals transmitting lightweight messages and signalling that it needs to transmit over the time-shared channel in the time slots allocated thereto during each multiplexing cycle.

A protocol for gaining access to the shared channel is provided. It may be similar to the protocols that are already known for gaining access to a signalling channel. Call entitlements, including entitlements to establish heavyweight calls are allocated in centralized manner in the control unit BG which dialogs for this purpose with the terminals over the signalling channel. It will nevertheless be understood that such allocation could also be achieved in decentralized manner in which priority calls are defined by dialog between the terminals over the signalling channel.

There follows a more concrete description of the terminal under consideration belonging to the first network given by way of example. It may be the terminal T1 as shown in FIG. 1, for example. A star coupler of the network is designated by reference CE.

An emitter 1 and a local oscillator 2 of the terminal under consideration are constituted by means of at least two semiconductor lasers whose frequencies are controlled electrically. An emission frequency control current is provided by said emission positioning means via a regulator circuit 41.

A current controlling the emitted optical intensity includes three components:

a DC bias component delivered by the regulator circuit 41;

an information-carrying modulation component including relatively low frequencies and constituted by a binary digital signal representative of the data that the user peripheral 50 associated with the terminal desires to transmit; this signal is formed in a circuit 52 connected to the user peripheral; and a positioning assistance modulation component which is sinusoidal and at a frequency higher than the frequencies of the information-carrying modulation component, which component constitutes a positioning assistance frequency FS. This third component is applied to the emitter 1 by a positioning assistance generator 53.

An optical switch 34 serves to isolate the emitter from an emission fiber 61 while the terminal is being positioned. An optical coupler 33 takes a portion of the wave delivered by the emitter to mix it in another optical coupler 31 with the waves received over a reception fiber 62. The coupler 31 constitutes said emission positioning mixer. The resulting mixed waves are detected by an emission positioning detector 10 of the quadrature type. The resulting electrical signal constitutes said emission positioning beat signal. Its frequency is measured by an emission position discriminator 11 which is centered on the frequency DF - 2FS. The discriminator delivers an emission position error signal for use in servo-controlling the emitter.

A heterodyning detector 20 detects the waves leaving a heterodyning mixer which is constituted by an optical coupler 32 and which receives the waves received over the reception fiber 62 and the wave emitted by the local oscillator 2. A reception position and frequency discriminator 21 centered on an intermediate frequency FI generates a reception position error signal enabling the local oscillator 2 to be servo-controlled. Information-extracting demodulation is performed on the signal detected at 20. It is performed by an amplifier circuit constituting a demodulation filter 22 centered on the intermediate frequency FI and by a regenerator 51 which reconstitutes the digital data in baseband for the user peripheral 50.

Overall control of the terminal is provided by a control circuit 40 which is constituted by a microcircuit and which is connected to the user peripheral 50 associated with the terminal.

The control circuit 40 has inputs which receive the error signals as digitized by an analog-to-digital converter 43. A memory 42 contains, in particular, the operating ranges of the lasers in the emitter 1 and the oscillator 2, i.e. a set of current values describing the tuning range of each of these lasers in steps. The circuit 40 generates reference signals and transmits them to a regulator circuit 41 which regulates the currents and the temperatures of the lasers. It also controls the state of the switch 34 connecting the emitter to the star coupler CE.

For this purpose, it is provided with software constituting the above-mentioned means and providing the following functions in particular:

calculating the tuning currents for the emitter and the local oscillator as a function of the position error signals in such a manner as to maximize the signal delivered by the discriminator 11 and to cancel the error measured by the discriminator 21, with the position of the terminal in the stack or above the stack having no effect on this servo-control;

implementing stack compression, i.e. detecting the disappearance of the call beneath by observing the variations in the power of the emission positioning beat signal and the 2xDF shift instruction which must result therefrom;

taking account of control information from the user peripheral: call requests including the address of the called terminal, alarm signals, and security signals specifying an incorrect transmission that should be interrupted and subsequently restarted;

taking account of signalling coming from the control unit when the terminal is on the shared channel, and in particular authorizations to establish wideband calls, i.e.

so-called "heavyweight" calls that need to be established over a message channel; and setting up a call, and in particular if the call is a heavyweight call lowering the frequencies of the lasers from the signalling frequency down to the positions they are to occupy during the call in compliance with the process described above.

The network includes a control unit BG which includes, in particular, the above-described base generator, marking generators, and signalling reference generator. As shown in FIG. 3, the control unit contains five lasers as follows:

a base generator B1 which is stabilized absolutely and which emits a base wave at a base frequency F0 to constitute a reference at the bottom of the spectrum range of the network;

two emitters B2 and B3 which are stabilized in relative manner and which emit the first and second marking waves to constitute two references at the top of the stack; and a signalling emitter B4 and a local oscillator B5 for use in dialoguing with free terminals over the shared channel.

A coupler B50 serves to inject the waves emitted by the sources B1, B2, B3, and B4 into an emission fiber B51 which is connected to the star coupler C3.

Figure 4:
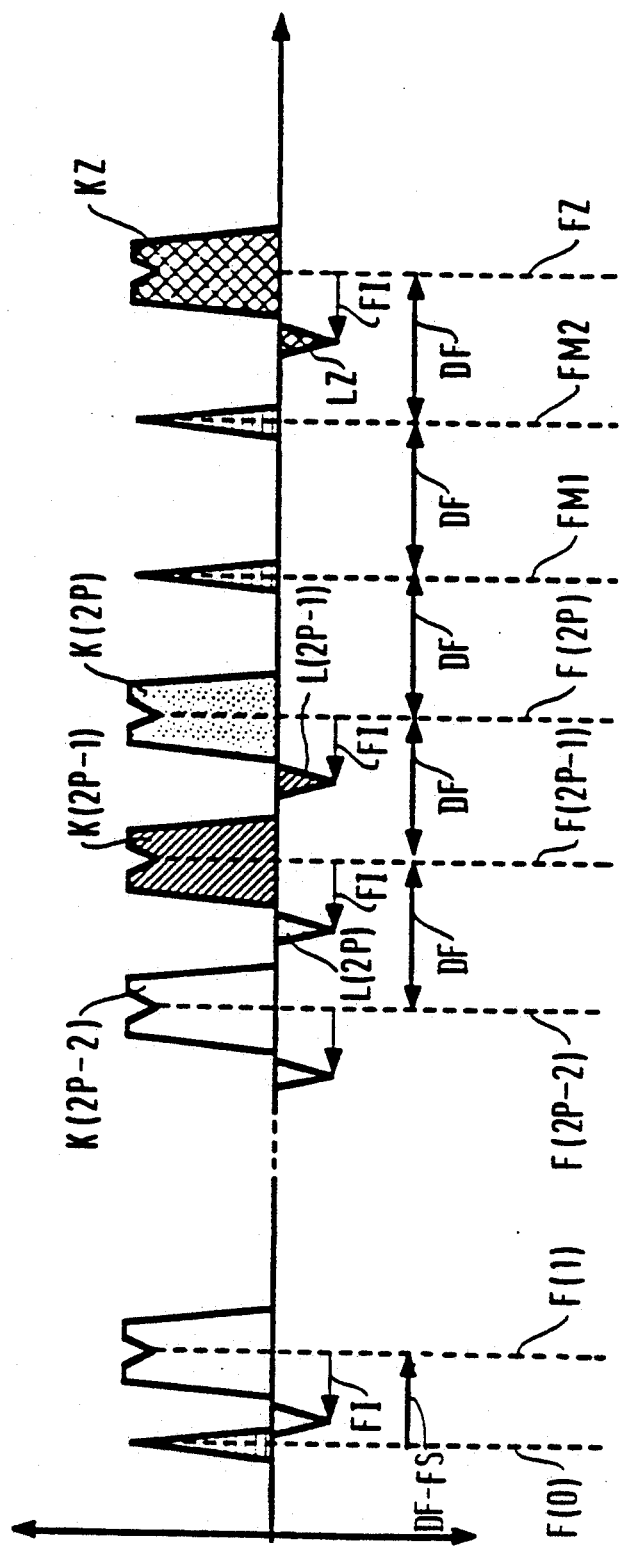
FIG. 4 shows the spectrum of various optical waves present on the first network.

The frequency FM1 of the first marking emitter B2 is servo-controlled (see FIG. 4) to a distance DF above the last message channel K(ZP). The frequency FM2 of the second marking emitter B3 is servo-controlled at a distance DF above the first marking frequency. The frequency of the signalling emitter B4 is servo-controlled to a distance DF above the second marking frequency. The emitters B2, B3, and B4 are subjected to positioning assistance modulation at the frequency FS so that the servo-control used can be identical to that used for the emitter of the terminal under consideration. For this purpose, a sinewave signal is delivered at the frequency FS by a positioning assistance generator B60.

Optical couplers B12, B13, and B14 are used to take fractions of the waves emitted by the emitters B2, B3, and B4 for the purpose of providing the beats required for servo-control purposes. Couplers B22, B23, B24, and B25 perform the following mixing operations respectively:

mixing the first marking wave from the emitter B2 with the signal from a reception fiber B52 for servo-controlling said emitter;

mixing the second marking wave from the emitter B3 with the first marking wave for servo-controlling said emitter;

mixing the signalling reference wave from the emitter B4 with the second marking wave to servo-control said emitter; and mixing the wave from the local oscillator B5 with the signal from the coupler B22 to servo-control said local oscillator.

Positioning receivers B32, B33, B34, and B35 provide position error signals E2, E3, E4, and E5 for these four servo-control operations. Each of the receivers B32, B33, and B34 is constituted by a quadratic detector and a filter centered on the frequency DF - 2FS. The receiver B35 is constituted by a frequency discriminator centered on the intermediate frequency FI.

A control circuit B70 has the following functions:

it performs the servo-control operations, for which purpose it receives the position signals E2, E3, E4, and E5 for the lasers B2, B3, B4, and B5 respectively;

it performs the protocol for gaining access to broadband communications by dialoguing with free terminals over the signalling channel, receiving messages D5 from these terminals via a demodulator B61, and transmitting messages D4 to these terminals by frequency modulating the signalling wave emitted by the emitter B4, thereby taking account of the various requests for broadband access and transmitting authorizations to set up calls; and it increases the frequencies of the lasers B2, B3, B4, and B5 by 2DF after a broadband call has been established so as to mark the new top of the stack taking support from the last emission frequency.

There follows a description of the setting up of a call and then the clearing down of a call.

Two free terminals are put into communication over the signalling channel K2. The control unit is also present on this channel. It is aware of current call requests, of such priorities as may exist, and of how the spectrum range of the network is occupied. As a function of this information it allocates call entitlements over the message channels marked at the top of the stack and over the shared channel.

During the time taken by the terminals concerned to position themselves on these channels, the waves emitted by these terminals must not be injected into their emission fibers in order to avoid disturbing other calls passing through the star coupler CE. For this purpose, the emitters are temporarily disconnected from the coupler by the switches such as 34.

The calling terminal:

reduces the frequency of its emitter by two 2xDF and it servo-controls it to DF above the highest emission frequency F(2P); and reduces the frequency of its local oscillator by DF and servo-controls it to F1 below the second marking frequency LM2.

The called terminal:

reduces the frequency of its emitter by DF and servo-controls it to DF above the first marking frequency LM1; and reduces the frequency of its local oscillator by 2xDF and servo-controls it to FI below the first marking frequency.

The emitters are reconnected to the star coupler and the control unit increases the marking frequencies by 2xDF to servo-control them on the new top of the stack. All of the free terminals are servo-controlled to these frequencies so they follow this movement.

When a call is cleared down, the two terminals engaged in the call disconnect their emitters from the star coupler. In each of these terminals, the frequency of the local oscillator is then temporarily servo-controlled on the emitter. The frequency of the emitter is increased to the top of the stack which it recognizes by detecting the two marking waves. The local oscillators and emitters can then be servo-controlled again on the signalling frequency. The calling terminal of the next call up detects that emission from the terminal beneath it has disappeared and shifts its emission frequency progressively through 2xDF to fill up the gap released by the call that has finished. All of the higher channels in the stack including the signalling channel follow this shift.

FIGS. 4 to 9 show the frequency spectrum of the network when a number P of calls are in progress, with the number 2P being less than the number N of the terminals. These figures show, in particular, a top pair of channels constituted by message channels K(2P-1)

and K(2P) used by the top pair of terminals, i.e. the pair of terminals whose emission frequencies F(2P-2) and F(2P) are the furthest from the base frequency F(0).

These two channels are shown with two different types of shading, with a given type of shading being used for all of the waves emitted by a given terminal and for all of the electrical signals that result therefrom. The top pair is the pair conveying the call that has most recently been set up on the network. That is why it is at the top of the stack. More precisely, the calling channel K(2P-1), i.e. the channel used by the calling terminal, constitutes the lower channel of said top pair, with this terminal thus constituting the lower terminal of this pair of terminals. In similar manner, the channel called K(2P) constitutes the upper channel of the same pair.

The emission frequencies of these two terminals are written respectively F(2P-1) and F(2P). These frequencies are the mid-frequencies of the corresponding channels.

The local reception waves L(2P-1) and L(2P) which are generated in these two terminals respectively are represented beneath the frequency axis to facilitate understanding the drawing. The message channels occupied by other terminals are shown without shading, and in particular the upper channel K(2P-2) occupied by the upper terminal of the top-but-one pair of terminals.

The emission frequency F(2P-2) which is situated in the middle of the channel K(2P-2) constitutes the lower support frequency for the terminal occupying the channel K(2P-2). The mid-frequency F(2P-1) of this channel constitutes the lower support frequency for the terminal occupying the channel K(2P).

In general, the frequency differences established over the network are represented by heavy horizontal arrows, with the arrow heads designating frequencies that are controlled or predetermined to ensure said differences.

Emission frequency servo-control is generally bilateral servo-control. That is why the servo-control arrows such as the arrow between frequencies F(2P) and F(2P-1) are generally two-headed arrows.

Emission frequency F(1) which is situated at the bottom of the stack is servo-controlled unilaterally relative to the base frequency F(0). The distances between terminals servo-controlled in this way are equal to the frequency increment DF, with the distance between the frequencies F(1) and F(0) being the positioning assistance frequency.

The signalling channel is shown at K2. The frequencies of the signalling reference wave and of the local reception wave of the signalling generator BG are shown at FZ and LZ, and the first and second marking frequencies are shown at FM1 and FM2, respectively.

The servo-control of the frequencies F(2P), FM1, and FM2 is bilateral. The servo-control of the frequency F2 is unilateral.

Figure 5:
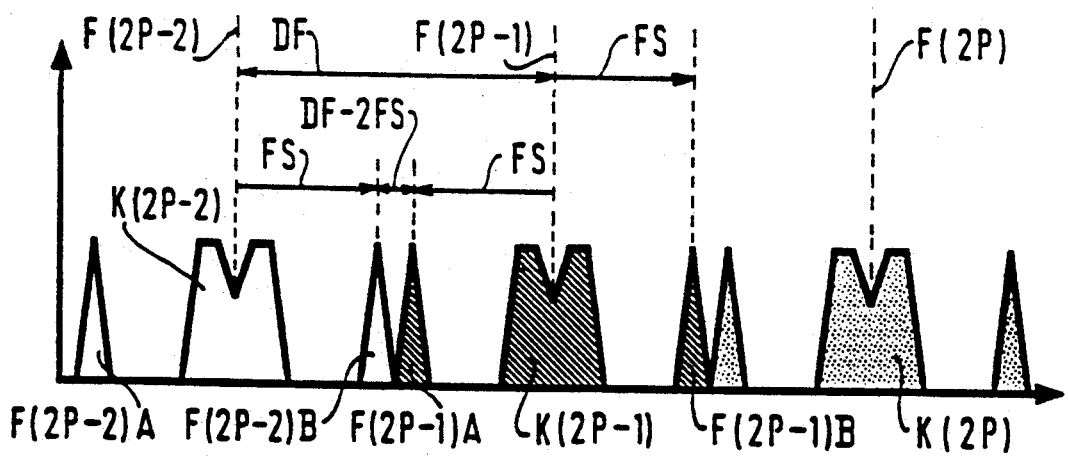
FIG. 5 shows the spectrum of various optical waves present on the reception fiber of a terminal belonging to the first network.

FIG. 5 shows the message channels K(2P-2), K(2P-1), and K(2P), together with their mid-frequencies F(2P-2), F(2P-1), and F(2P). This figure also shows said first and second positioning assistance side frequencies F(2P-1)A and F(2P-1)B of the terminal under consideration which occupies the channel K(2P-1). These frequencies are respectively equal to F(2P-1)−FS and F(2P-1)+FS.

For the channel K(2P-2) the corresponding waves are shown at (F(2P-2)A) and (F(2P-2)B), respectively.

The lower support distance F(2P-1)-F(2P-2) of the terminal occupying the channel K(2P-1) is maintained equal to the frequency increment DF because the difference between the frequencies F(2P-1)A and (F(2P-2)B) is maintained equal to said emission positioning reference frequency which is equal to DF-2FS.

Figure 6:
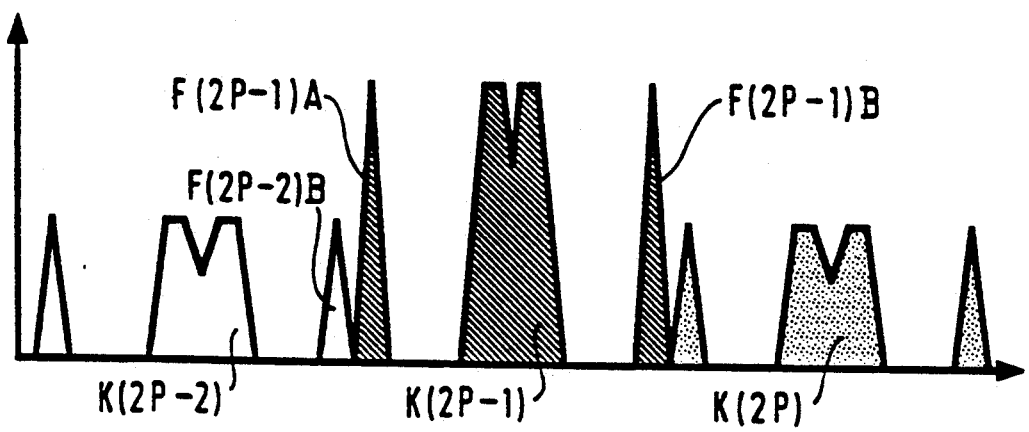
FIG. 6 shows the spectrum of the optical waves of FIG. 5 after said waves have been mixed with the optical waves emitted by the emitter in the same terminal.

FIG. 6 shows the spectrum of the same optical waves at the inlet to the detector 10 of the terminal under consideration. It differs from FIG. 5 by the waves from the emitter 1 being of increased relative intensity, i.e. the waves occupying the channel K(2P-1) and the side frequencies (F(2P-1)A) and (F(2P-1)B).

Figure 7:
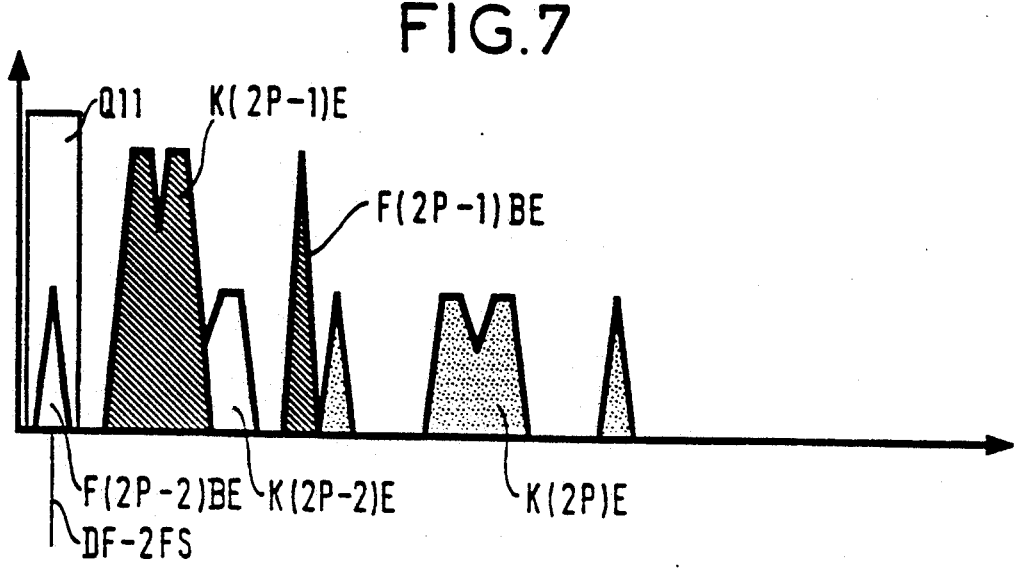
FIG. 7 shows the spectrum of electrical signals that results from detecting the optical waves of FIG. 6 to enable the spectrum position of the emitter in the terminal of FIG. 2 to be servo-controlled.

FIG. 7 is a diagram showing a theoretical spectrum of the electrical signals that result from detecting said waves in the detector 10. The passband of the discriminator 11 is centered on the positioning reference frequency DF-2FS and is shown at Q11. The signals resulting from detecting some of the waves are designated by the references for said waves plus the letter E. Their frequencies are equal to the difference between the frequencies of said waves and the first positioning assistance side frequency (F(2P-1)A) of said terminal which is one of the higher power frequencies. It will be understood that some signals have been omitted such as those that result from beats of various waves with the channel K(2P-1) or with the frequency (F(2P-1)B) which also correspond to high powers. It will also be understood that some signals such as K(2P)E are shown to facilitate understanding but that they are at frequencies which are too high to appear in fact in electrical form at the outlet from the detector.

Figure 8:
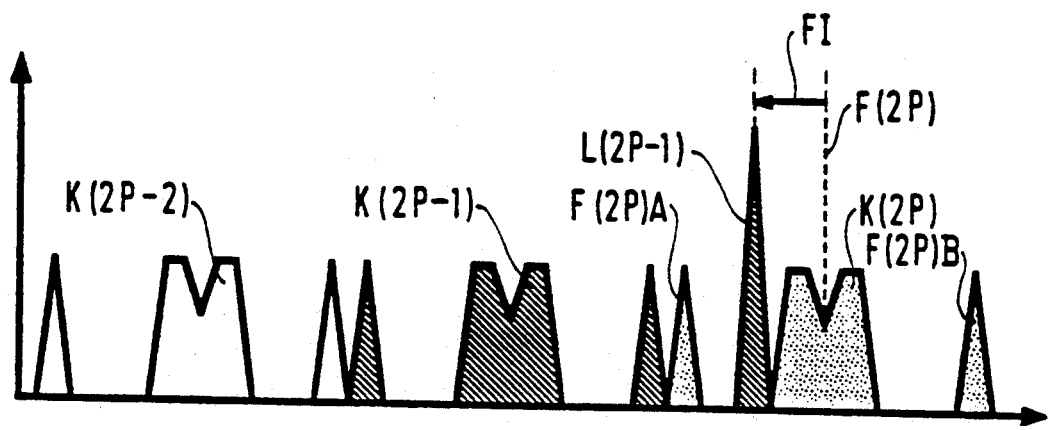
FIG. 8 shows the spectrum of the optical waves of FIG. 5 after these waves have been mixed with the optical wave emitted by the local oscillator in the terminal of FIG. 2.

FIG. 8 represents the optical spectrum at the inlet of the terminal 20 in the terminal under consideration. In this spectrum the highest power wave is the local reception wave coming from the local oscillator 2 and its frequency is designated by reference L(2P-1) and is equal to F(2P)-FI because of the servo-control performed by means of the detector 20.

Figure 9:
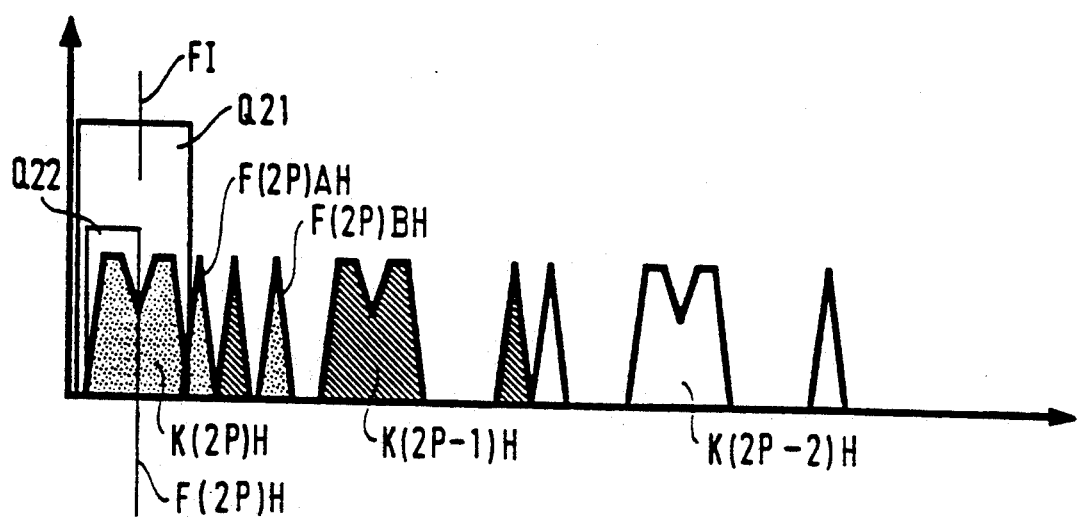
FIG. 9 shows the spectrum of the electrical signals that result from detecting the optical signals of FIG. 8 to enable the frequency of the local oscillator of the terminal of FIG. 2 to be servo-controlled.

FIG. 9 shows the electrical signals resulting from some of these waves being detected by the detector 20, with the electrical signals being designated by the same references as said waves plus the letter H. Their frequencies are equal to the difference between the frequencies of said waves and the high power frequency L(2P-1). The same remarks apply as applied to FIG. 7.

The passbands of the discriminator 21 and of the amplifier and filter circuit 22 are shown as Q21 and Q22 respectively.

Figure 10:
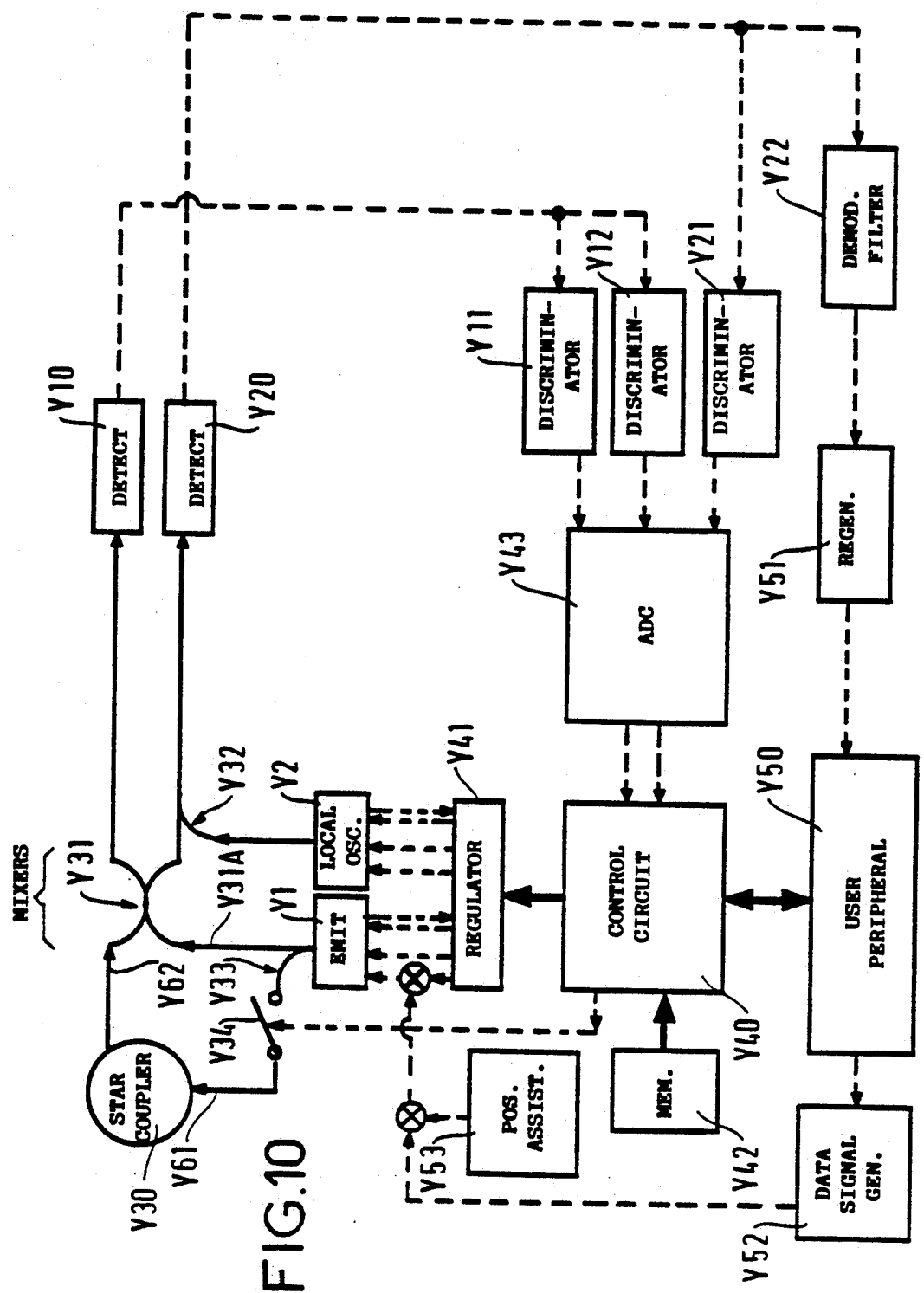
FIG. 10 is a block diagram of a terminal in a second network given as an example of an implementation of the present invention.

The second network constituting an embodiment of the present invention is now described. This network is shown in FIG. 10. It is generally similar to the above-described first network except that it operates in alternating mode and compared with the first network it has dispositions that differ at least in part and that are adapted to this mode of operation, with some of them now being described.

Firstly, and in general, it is advantageous for said support discrimination means of the terminal under consideration in a network operating in alternating mode to include means for forming the support discrimination wave that are put into action by said loss-of-support signal to provide a support discrimination wave to said local input (Y31A) of said emission positioning mixer (Y31) of the terminal, which support discrimination wave has a support discrimination frequency at a support discrimination spectrum difference from a value of said local emission positioning frequency immediately prior to said loss-of-support signal being formed that is suitable to cause a positioning difference to appear affecting the frequency of said emission positioning beat signal, said positioning difference being capable of having one or other of two algebraic signs, positive and negative; said loss-of-lower-support signals being provided when said positioning difference has a predetermined algebraic sign.

In another advantageous disposition, the support discrimination wave forming means are means for giving rise to an emission difference that temporarily affects the emission frequency of the terminal under consideration. This emission difference may be positive, for example i.e. the emission frequency may be moving temporarily a little further from the base frequency. When the positioning assistance frequency FS is less than half the frequency increment DF, the loss-of-lower-support signal will be provided and the emission frequency will be shifted progressively towards the base frequency if the emission positioning beat signal is subjected to a negative frequency difference. This may be detected, for example, by a control circuit Y40 at the output of a support discriminator Y12 constituted by a frequency discriminator provided for this purpose and fed from the output of the emission positioning detector Y10.

Figure 2:
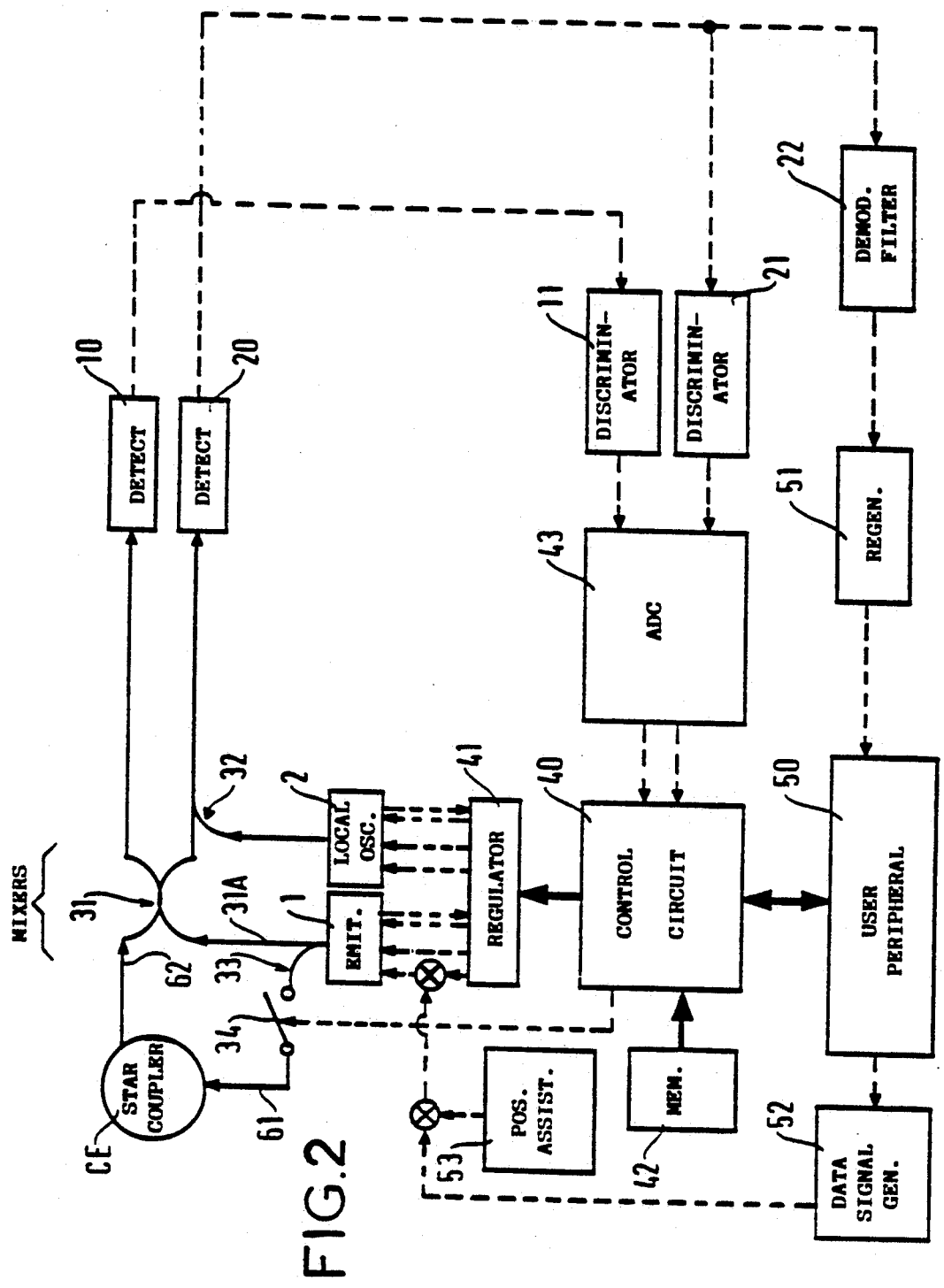
FIG. 2 is a block diagram of a terminal in the first network.

As shown in FIG. 10, the terminal under consideration of the network operating in alternating mode includes items analogous to those of the terminals shown in FIG. 2 except that the support discriminator Y12 is added and the control circuit Y40 is partially modified. When two items in these two terminals are analogous, the reference symbols designating these two items are the same except that the letter "Y" is added to the beginning of the reference symbols used for items in the terminal shown in FIG. 10.

We claim:

1. A method of communicating over optical fibers using frequency multiplexing wherein emission frequencies used as carrier frequencies for simultaneous calls form a stack in which the emission frequencies follow one another from a base frequency up to a top of the stack, and are spaced from one another by respective spectrum distances that are not less than a predetermined frequency increment, the method comprising the steps:

prior to each call, bringing a respective emission frequency that is to be used for the call to the top of the stack;

during the call, servo-controlling said respective emission frequency to a spectrum distance equal to said frequency increment from a respective lower support frequency specific to said respective emission frequency;

continuing said servo-controlling step so long as said respective lower support frequency can be detected; and shifting said respective emission frequency during a call progressively towards said base frequency whenever no such respective lower support frequency can be detected.

2. A communications network for communicating over optical fibers using frequency multiplexing, the network comprising:

a plurality of terminals associated with as many respective user peripherals between which messages are to be transmitted;

two optical fibers associated with each of said terminals to guide optical waves, said fibers comprising an emission fiber for guiding emission waves from the terminal and a reception fiber for guiding waves that are to be received by the terminal; and a star coupler for receiving the optical waves that reach the coupler via said emission fibers and for transmitting each of said optical waves to all of the terminals via said reception fibers;

wherein each said terminal in the network comprises:

reception means for demodulating at least some of the waves received by the terminal;

an emitter for emitting said emission wave at a controlled emission frequency and for applying information-carrying modulation to said wave;

emission positioning means for positioning said controlled emission frequency in a spectrum range of the network in such a manner that the various emission frequencies of the network constitute a stack in which the emission frequencies follow one another from a fixed base frequency up to a stack top and are distant from one another by respective spectrum distances that are not less than a predetermined frequency increment, said emission positioning means further comprising means for initial emission positioning which is put into action when the terminal becomes free or at least before the beginning of a new call, and which brings the controlled emission frequency to the top of the stack;

lower support detection means for detecting the presence, if any, of an external lower emission positioning wave from amongst the received waves received by the terminal, said external lower emission positioning wave being constituted by one of said received waves and defining a support frequency below the controlled emission frequency and closer to the base frequency than the controlled emission frequency, said lower support detection means providing a loss-of-lower-support signal when such an external lower emission positioning wave no longer exists;

an emission positioning mixer for mixing the waves received by the terminal with a local emission positioning wave which has a frequency in the optical range and which is applied to a local input of said mixer from the emitter of the terminal to represent the local emission positioning frequency of the terminal, an emission positioning detector receiving signals from said emission positioning mixer and forming beat signals that are electrical, each beat signal being the result of mixing said local emission positioning wave with a respective one of said received waves, at least one of said beat signals constituting an emission positioning beat signal if the respective received wave constitutes an external emission positioning wave defining a support frequency for the terminal, the frequency of said emission positioning beat signal constituting an emission positioning beat frequency which defines a support distance between said controlled emission frequency and said support frequency, one of said received waves constituting said external positioning wave only if said support distance lies in a predetermined support range including said predetermined frequency increment, and emission position control means responsive to said emission positioning beat frequency for controlling said controlled emission frequency to make the difference between said controlled emission frequency and said support frequency of the terminal equal to said predetermined frequency increment; and thereby servo-controlling the position of the controlled emission frequency during a call, which means are kept in action throughout a call so long as one such support frequency exists below the controlled frequency; and emission shift means which are put into action during a call whenever one of said loss-of-lower-support signals is provided for the terminal, said means progressively moving the controlled emission frequency towards the base frequency until said loss-of-lower-support signal is no longer provided.

3. A network according to claim 2, wherein said lower support detection means comprise:

non-selective support detection means for providing a loss-of-support signal when one of said external emission positioning waves for the terminal no longer exist; and support discrimination means which are put into operation at least when said loss-of-support signal is provided and which then provide said loss-of-lower-support signal if the external emission positioning wave that has disappeared was one of said lower external emission positioning waves.

4. A network according to claim 3, wherein said non-selective support detection means monitor the power of said emission positioning beat signal and provide said loss-of-support signal when said power decreases in a predetermined manner.

5. A network according to claim 3, wherein said support discrimination means operates in duplex mode and stores, at the beginning of each call and until the end of said call, a relative position bit representative of the fact that the associated terminal is calling or is called and is consequently a lower terminal or an upper terminal in a pair of terminals engaged on said call, the lower terminal using an emission frequency closer to the base frequency than the emission frequency of the upper terminal, said means providing a low indication if the associated terminal is the lower terminal in the pair; and said loss-of-lower-support signal is provided when said loss-of-support signal and said low indication are provided simultaneously.

6. A network according to claim 3, wherein said support discrimination means operates in alternating mode and includes support discrimination wave forming means which are put into action by said loss-of-support signal to provide said local input of said emission positioning mixer of the terminal with a support discrimination wave having a support discrimination frequency which, relative to a value of said local emission positioning frequency that existed immediately prior to said loss-of-support signal being formed, presents a support discrimination spectrum difference suitable for causing a positioning difference to appear affecting the frequency of said emission positioning beat signal, said positioning difference being capable of having one or other of the positive and negative algebraic signs; and said loss-of-lower-support signal being provided when said positioning difference has a predetermined algebraic sign.

7. A network according to claim 6, wherein said support discrimination forming means are means for causing an emission difference that temporarily affects the emission frequency of the terminal under consideration.

8. A network according to claim 7, wherein said support discrimination means includes a frequency discriminator connected to the output of said emission positioning detector to constitute a support discriminator.

9. A network according to claim 2, wherein said network further comprises a signalling reference generator itself comprising:

a signalling emitter controllable in frequency to emit an optical wave which constitutes a signalling reference wave at a signalling frequency;

signalling positioning means including signalling position servo-control means and signalling position shift means for positioning said signalling frequency in the spectrum range of the network;

an emission fiber for guiding said signalling reference wave to said star coupler; and a reception fiber for guiding optical waves that have been transmitted via the coupler and which are received by said generator;

said signalling position servo-control means is analogous to the position servo-control means of the terminal, and comprises:

a signalling positioning mixer for receiving firstly said waves received by the signalling reference generator and secondly a local signalling positioning wave that is optical and that defines said signalling frequency;

a signalling positioning receiver receiving signals from said signalling positioning mixer to form beat signals that are electrical, one of which is a signalling positioning beat signal resulting from mixing said local positioning wave with an external signalling positioning wave constituted by one of said received waves defining a signalling support frequency which is the most distant frequency in the stack of said emission frequencies, the frequency of said signal constituting a signalling positioning beat frequency lying in a predetermined range and representative of a spectrum distance between said signalling frequency and said signalling support frequency; and signalling frequency control means which are responsive to said signalling positioning beat frequency and which control said signalling frequency to servo-control the spectrum distance between said signalling frequency and said signalling support frequency to be equal to a predetermined spectrum distance supplement which constitutes a signalling supplement;

said signalling position shift means operates whenever a new call is set up to move the signalling frequency away through a shift distance which is equal to the same number of frequency increments as the number of emission frequencies used by the new call; and said emission positioning means of the terminal under consideration comprises:

signalling search means for progressively moving its emission frequency away from the base frequency when the terminal becomes free, and for recognizing coincidence between said emission frequency and said signalling frequency; and standby servo-control means controlled by said signalling search means for servo-controlling said emission frequency to said signalling frequency from the moment when coincidence has been recognized between said two frequencies.

10. A network according to claim 9, wherein the terminal under consideration further includes initial positioning means for reception standby to bring said local frequency of said terminal to a spectrum position whose distance from said signalling frequency is equal to said intermediate frequency whenever said terminal is free so that said reception means can subsequently receive messages in a signalling channel.

* * * * *